250/201 PF

United States Patent [19]
Wilwerding

[11] Patent Number: 4,684,798
[45] Date of Patent: Aug. 4, 1987

[54] PERFORMANCE IMPROVEMENT FOR CAMERA AUTOFOCUS

[75] Inventor: Dennis J. Wilwerding, Littleton, Colo.

[73] Assignee: Honeywell Inc., Minneapolis, Minn.

[21] Appl. No.: 783,895

[22] Filed: Oct. 3, 1985

[51] Int. Cl.⁴ .............................................. G01J 1/20
[52] U.S. Cl. .................................... 250/201; 354/408
[58] Field of Search ................. 250/201 PF, 204, 209, 250/578; 354/402, 408; 358/212, 213, 227

[56] References Cited
U.S. PATENT DOCUMENTS

| | | | |
|---|---|---|---|
| 4,321,486 | 3/1982 | Boler et al. | 307/311 |
| 4,333,007 | 6/1982 | Langlais et al. | 250/201 |
| 4,483,602 | 11/1984 | Aoki et al. | 354/402 |
| 4,529,886 | 7/1985 | Yokoyama et al. | 358/212 V X |
| 4,547,676 | 10/1985 | Suzuki et al. | 250/204 X |
| 4,584,656 | 4/1986 | Sakai et al. | 250/204 X |
| 4,602,153 | 7/1986 | Suzuki | 250/201 PF |

*Primary Examiner*—Eugene R. LaRoche
*Assistant Examiner*—David Mis
*Attorney, Agent, or Firm*—Charles J. Ungemach

[57] ABSTRACT

A system for improving the operation of an autofocus circuit under high intensity light situations by controlling the "start" time of a plurality of detectors directly from a computer rather than through a clock which is limited in its ability to "start" by the phases of signals it generates.

10 Claims, 2 Drawing Figures

PERFORMANCE IMPROVEMENT FOR CAMERA AUTOFOCUS

BACKGROUND OF THE INVENTION

In U.S. Pat. No. 4,321,486 of Clifford H. Boler and myself and assigned to the assignee of the present invention, a system is described for use in autofocus cameras particularly of the through the lens type such as is found in the U.S. Pat. No. 4,333,007 of Richard A. Langlais, Francis T. Ogawa, and myself and also assigned to the assignee of the present invention.

Such systems operate utilizing a plurality of light sensitive detectors which are normally of the CCD type arranged in pairs behind a plurality of lenslets so as to receive an image of the exit pupil of the taking lens that receives light from the remote subject to be focused upon. If the taking lens is at the correct focal position, the outputs of the two detectors behind each lenslet will be substantially the same, but as the taking lens moves from the desired focal position, differences in the outputs of the two detectors behind each lenslet will occur in such a manner that the system may determine the direction and amount of movement necessary to bring the taking lens back to the proper focal position. In the circuitry of the prior art, a clock phase generator is employed to drive a shift register and a microprocessor operating through a bus control and an R-S flip-flop, operates to produce a "start" signal in synchronism with the clock to activate the detectors. The detectors then begin the process of integrating the light they receive. After a short period of time which depends normally upon the intensity of light being received, the clock operates to activate a transfer gate which then dumps the built-up charges on the individual detectors in parallel into the shift register. The shift register produces these signals in series to the microcomputer so that they may be analyzed to determine the correct output for proper focus.

Because the shift register is driven by the clock producing 3 phases, $\phi_1$, $\phi_2$, and $\phi_3$, there are only predetermined times available when the charges from the detector may be dumped into the shift register (for example, upon the occurrence of a $\phi_1$ signal). When it is desired to "start" the detectors, the microprocessor through the bus control produces a signal, this signal is usually the removal of a voltage to the reset terminal of an R-S flip-flop to cause resetting thereof. The set terminal of the flip-flop is connected to the clock so that after reset, the next $\phi_1$ of the clock causes the flip-flop to produce an output to activate the detectors. At the end of the desired integrating period, a signal from the microprocessor causes the clock to produce a transfer signal, at the next $\phi_1$, directly to the transfer gate which then dumps the charges from the detectors into the shift register.

In the system described above, the switching on and off must be done in synchronism with the clock, and as will be more fully discussed hereinafter in connection with FIG. 1, this produces a problem when very high intensities of light are encountered. Since, as mentioned above, the flip-flop is triggered by the falling edge of one of the three phases of the clock, the detectors can only be activated at one of these three times in a cycle. Likewise, since the shift register can only receive the charges from the detectors at the predetermined times (for exmaple the falling edge of $\phi_1$), the transfer gate can be activated only then. Therefore, the minimum time period between activation of the detectors and dumping the charges into the shift register can be no shorter than the time from one falling edge of a signal from the clock to the next time the shift register is capable of receiving the next group of charges, i.e., the time between the two consecutive $\phi_1$'s. This time period, although very short, may be still too long in the event of high intensities of light and the detectors may saturate and thus loose the significance of their charges during that short time period. Furthermore, there is no way to vary the exposure time of the detectors between the occurrences of all three phases.

SUMMARY OF THE INVENTION

The present invention provides an improvement which will allow the "start" signal to the detectors to occur at any desired time so that then the time period between the "start" signal and the "transfer" signal can be made as short as is needed and can be made as variable as desired. More particularly, the present invention provides this feature by allowing the microprocessor operating through the bus control to directly and asynchronously with the clock, produce the "start" signal to the detectors rather than, as in the prior art, producing the "start" signal in conjunction and synchronously with the clock. Thus, the microprocessor alone controls the time of "start" and, while the clock must still control the "transfer" signal (because the shift register driven thereby can only accept charges at predetermined times in its cycle) being able to start at a time later than that allowed by the falling edge of on of the three phases permits the narrowing of the integration time to any desired value and thus allows greater light intensities to be considered.

DETAILED DESCRIPTION OF THE PREFERRED EMBODIMENT

Figure 1:
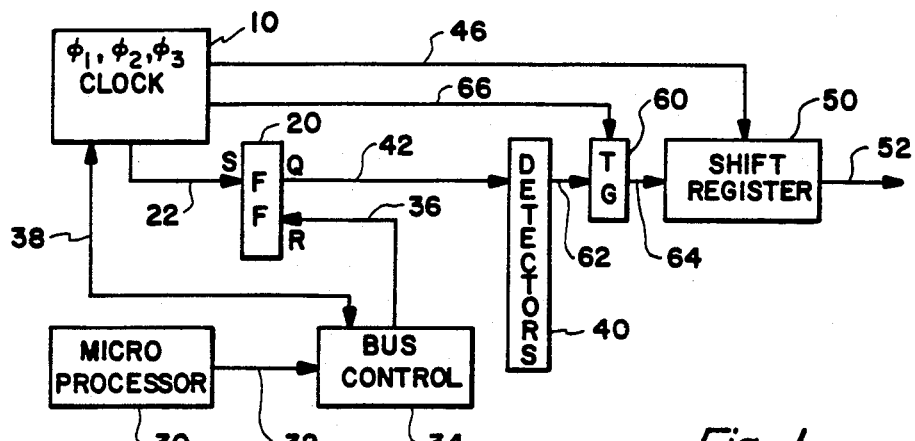
FIG. 1 shows a simplified block diagram of the circuitry of the prior art.

FIG. 1 shows a simplified block diagram of the prior art similar to that shown in the above-referred to United States patents. In FIG. 1 a clock 10 is shown producing three phase signals identified as $\phi_1$, $\phi_2$, and $\phi_3$. An R-S flip-flop 20 is shown having a "S" input connected to receive at least one of the phase signals from clock 10 by way of a line 22.

A control microprocessor 30 is also shown which is connected by way of a line 32 to a bus control 34. The bus control is connected to the "R" input of flip-flop 20 by way of a line 36. Bus control 34 is also connected to clock 10 and vise versa by line 38 so that microprocessor 30 is aware of the phase timings of the clock 10 and clock 10 can receive command signals from microprocessor 30.

An array of detectors 40, which detectors may be of the CCD type, is shown connected to receive the "Q" output from flip-flop 20 by way of a line 42. The "Q" output from flip-flop 20 on line 42 is used to produce the "start" signal for the detectors in array 40. Although not shown, the detectors in the array 40 receive light through the taking lens of a camera from a remote object and upon the occurrence of a "start" signal, begin integrating that light.

Clock 10 is also shown connected by way of a line 46 to a shift register 50 and thereby controls the timing of the shift register synchronously with the phase $\phi_1$, $\phi_2$, and $\phi_3$. At certain predetermined times, the shift register produces the charges stored therein on a line 52 which is used to provide information to utilization apparatus such as a computer or back to microprocessor 30 in order to enable the computer to determine the proper focus position for the taking lens of the camera. Accordingly, there is only certain times at which the shift register 50 is capable of receiving charges from the detectors 40. These times are controlled by the clock 10 and a transfer gate 60 which is shown connected between detector array 40 and shift register 50 by lines 62 and 64 respectively. Transfer gate 60 is connected to clock 10 by way of a line 66. A signal such as $\phi_1$, $\phi_2$ or $\phi_3$ trailing edge on line 66 from clock 10 operates to open transfer gate 60 at such times as the shift register 50 can receive the charges from the detectors in array 40 and the charges on the detectors are then dumped via line 62, transfer gate 60, and line 64 into shift register 50.

Because flip-flop 20 operates to produce a signal from its "Q" output on line 42 only upon the occurrence of a set signal from clock 10, e.g., the trailing edge of a $\phi_1$, $\phi_2$, or $\phi_3$, on line 22 after receipt of a reset signal from microprocessor 30 through bus control 34 on line 36, the "start" time for the detector array 40 is limited to the time that the trailing edge of the chosen phase occurs from clock 10. More particularly, if the prior art utilized the falling edge of, say, the $\phi_1$ signal to operate flip-flop 20, the "start" signal to the detector array 40 could only occur at that time. Since, as mentioned above, transfer gate 60 can only dump the charges into shift register 50 at predetermined times (for example, another falling edge of, say, $\phi_1$), the shortest interval of time between the "start" and the "transfer" is the time interval between two falling edges of the $\phi_1$ signal. This time period may be too long to accommodate certain very bright scenes wherein the intensity of light falling on the detectors in array 40 is great enough that during this short interval of time the detectors will have integrated all of the light they can, have saturated, and their output become relatively useless for analyzation by the downstream computer. If attempts are made to operate the flip-flop 20 on the occurrence of a $\phi_2$ or $\phi_3$ falling edge, this time could be shortened but perhaps still not enough and other problems would also be involved, i.e., no matter which phase is chosen to set the flip-flop 20, there can thereafter be no variation in the start signal and the timer period between two set signsl will still be the full three phase signals. Thus, if a time greater than that between $\phi_3$ and $\phi_1$ but less than the time between $\phi_1$ and the next $\phi_1$ were desired, the apparatus could not accommodate it. It is therefore desirable to provide "start" time which is not dependent on the clock phases so that shorter and more variable exposure times for the detectors than that presently available in the prior art.

Figure 2:
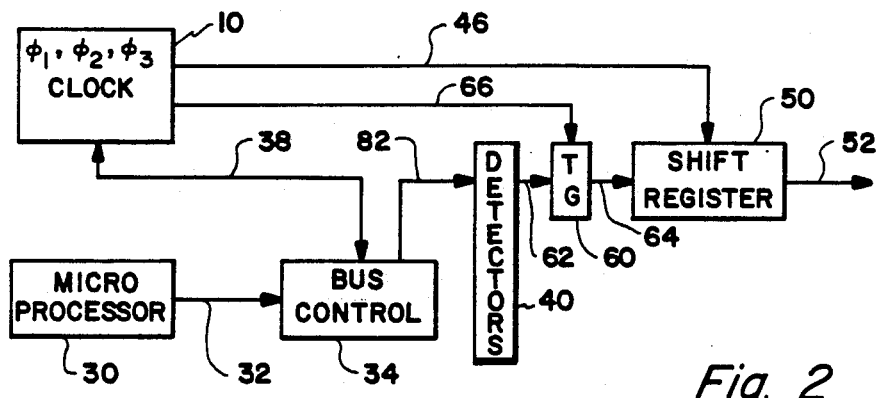
FIG. 2 shows a block diagram of the present invention.

In FIG. 2, a relatively simple modification to the circuit of FIG. 1 enables the "start" signal to be produced at any time rather than at only those times dictated by the falling edge of on of the three phase signals. In FIG. 3, the components which are common to FIG. 2 have the same reference numerals for convenience. Clock 10 is again shown producing the three phase signals $\phi_1$, $\phi_2$, and $\phi_3$. The microprocessor 30 is also shown connected by way of the line 32 to the bus control 34. The detector array 40 is shown connected to the transfer gate 60 by way of the line 62 and the shift register 50, having an output on line 52, is shown connected to the transfer gate 60 by way of a line 64. Shift register 50 is again connected to the clock 10 by way of a line 46 to receive the timing signals therefrom and the transfer gate 60 is again activated by clock 10 via line 66. Clock 10 is shown connected to the bus control by a two-way line 38 so that microprocessor 30 can receive information of the timing of clock 10 and can send a signal through bus control 34 to clock 10 when it is desired to terminate integration and transfer the charges from the detectors and arra 40 through transfer gate 60 to shift register 50.

In FIG. 2 the flip-flop 20 of FIG. 1 has been eliminated and the "start" signal to the detectors in array 40 is controlled directly by the microprocessor 30 through the bus control 34 via a line 82. Accordingly, when it is desired to begin integration, microprocessor 30 through bus control 34 sends a "start" signal by way of line 82 to the detectors in array 40 and this signal may be produced at any particular time chosen by microprocessor 30 regardless of the phases of the signals to clock 10. Later, when it is desired to stop integration and transfer the signals to the shift register 50, microprocessor 30 through bus control 34, line 38, and clock 10 produces a signal on line 66 to transfer gate 60 so that the charges are then dumped into shift register 50. Although this latter signal can only occur at predetermined times as before, the "start" signal on line 82 can be as short prior to this time as is necessary to accommodate high lighting situations.

Accordingly, it is seen that I have provided a circuit with only a simple adjustment from the prior art to accomplish an improved performance under high intensity situations for an autofocus circuit. By doing so I have eliminated components which make the resulting circuitry simpler and less expensive. I do not wish, however, to be limited by the specific disclosures used in connection with the preferred embodiment and intend rather only to be limited by the following claims.

I claim:

1. A system having clock means producing synchronous signal outputs, control means operable to product first and second command signals and light responsive detector means to begin sensing light from a remote object at a first time $T_1$ and to build a charge of magnitude indicative of the light received until a second time $T_2$ when the charge is transferred to utilization apparatus, comprising:

first means connecting the control means to the clock means to present the second command signal thereto, the clock means producing a synchronous transfer signal at a time $T_2$ upon receipt of the second command signal;

second means connecting the clock means to the detector means to present the transfer signal thereto and cause the transfer of charge from the detector means to the utilization apparatus; and third means connecting the control means to the detector means to provide the first command signal asynchronously thereto at time $T_1$ to cause the detector means to begin sensing light.

2. Apparatus according to claim 1 wherein the detector means includes a transfer gate, the utilization apparatus includes a shift register and the second means connects the clock means to the transfer gate so that upon the receipt of the transfer signal, the charge from the detector means is transferred through the transfer gate to the shift register.

3. Apparatus according to claim including fourth means connecting the clock means to the shift register to supply the synchronous signal outputs thereto.

4. Apparatus according to claim 3 wherein the control means is a microprocessor and the system is an autofocus circuit, the shift register produces a charge signal indicative of the charges in the detectors for use by the microprocessor and the focus position is determined by the microprocessor from the charge signal.

5. A plurality of light sensitive detectors which build up a charge from a "start" time $T_1$ to a "transfer" time $T_2$ of magnitude dependent upon the amount of light thereon, further including a shift register that is timed by a clock producing multiple phase signals and that receives the output of the plurality of the detectors in parallel at time $T_2$ synchronized with the clock signals, and further including a control device operable in cooperation with the clock to provide a transfer signal when it is desired to transfer the output of the detectors to the shift register, at time $T_2$, the improvement comprising:
   means connecting the control device to the detectors to supply a start signal thereto, the start signal being independent of the clock and operable to start the build up of charge on the detectors at time $T_1$.

6. Apparatus according to claim 5 wherein the light sensitive detectors are CCD's, and a transfer gate controlled by the transfer signal is included between the detectors and the shift register.

7. Apparatus according to claim 6 wherein the control device is a computer, the shift register produces an output in series and of a magnitude indicative of the accumulated charge on the detectors, and the system is an autofocus circuit with the computer receiving the output of the shift register to calculate the proper focus condition.

8. The method of controlling the accumulated charge on light sensitive detectors by controlling the duration from a "start" time $T_1$ to a "transfer" time $T_2$ that the detectors are allowed to build up charge upon being exposed to light, comprising the steps of:
   producing a clock signal to drive a shift register;
   producing a "transfer" signal to open a transfer gate at time $T_2$ synchronously with the clock signal; and
   producing a "start" signal asynchronously with the clock signal to start the accumulation of charge by the detectors.

9. A circuit for use in a light sensing system comprising:
   a clock producing three phase signals;
   a shift register having an output and connected to the clock to be controlled by the three phase signals;
   a detector array exposed to light from a remote object and operable upon receipt of a "start" signal to build up a charge of magnitude dependent upon the amount of light received thereby;
   a transfer gate connected between the detector array and the shift register, and connected to be controlled by a "transfer" signal from the clock to transfer any charges on the detector into the shift register;
   a microprocessor connected to the clock and operable in cooperation therewith to produce the signal to the transfer gate, the microprocessor further connected to the detector array to provide the "start" signal thereto independently of the clock.

10. Apparatus according to claim 9 wherein the light sensing system is part of an autofocus system for a camera, the detector array includes a plurality of CCD detectors each operable to build up a charge of magnitude dependent upon the amount of light it receives between the "start" signal and the transfer signal and the output of the shift register is connected to a computing device to determine the proper focus position for the camera with respect to the remote object.

* * * * *